US008095645B2

(12) United States Patent
Ninan et al.

(10) Patent No.: US 8,095,645 B2
(45) Date of Patent: Jan. 10, 2012

(54) TRAFFIC FLOW INFERENCE BASED ON LINK LOADS AND GRAVITY MEASURES

(75) Inventors: Bobby Ninan, Raleigh, NC (US); Gordon M. Bolt, Apex, NC (US); Edward Sykes, Cary, NC (US); Scott Glasser, Chapel Hill, NC (US); Alain Cohen, Washington, DC (US); Yevgeny Gurevich, Washington, DC (US)

(73) Assignee: OPNET Technologies, Inc., Bethesda, MD (US)

( * ) Notice: Subject to any disclaimer, the term of this patent is extended or adjusted under 35 U.S.C. 154(b) by 1259 days.

(21) Appl. No.: 11/755,089

(22) Filed: May 30, 2007

(65) Prior Publication Data
US 2007/0280113 A1 Dec. 6, 2007

Related U.S. Application Data

(60) Provisional application No. 60/803,759, filed on Jun. 2, 2006.

(51) Int. Cl.
*G06F 15/173* (2006.01)
(52) U.S. Cl. ......... 709/224; 709/223; 709/225; 709/226
(58) Field of Classification Search .......... 709/223–226; 715/734–738, 853, 969
See application file for complete search history.

(56) References Cited

U.S. PATENT DOCUMENTS 6,061,331 A * 5/2000 Conway et al. ............... 370/232
7,293,086 B1 * 11/2007 Duffield et al. ............... 709/224
7,574,506 B1 * 8/2009 Duffield et al. ............... 709/224
(Continued)

FOREIGN PATENT DOCUMENTS
EP 87308798.5 5/1987
(Continued)

OTHER PUBLICATIONS

Gunnar et al; Traffic Matrix Estimation on a Large IP Backbone—A Comparison on Real Data; IMC'04, Oct. 25-27, 2004; Taormina, Italy.
(Continued)

*Primary Examiner* — David Lazaro
*Assistant Examiner* — Edward Kim
(74) *Attorney, Agent, or Firm* — Robert M. McDermott

(57) ABSTRACT

Traffic flow between each pair of nodes in a network are determined based on loads measured at each link and based on gravity measures associated with each node. The gravity measures correspond to a relative likelihood of the node being a source or a sink of traffic, and may be assigned based on 'soft' characteristics associated with each node, such as the demographics of the region in which the node is located, prior sinking and sourcing statistics, and so on. Because the assigned gravities are relatively subjective, the gravity measures are used to generate an objective function for solving a system of linear equations, rather than as criteria that must be satisfied in the solution. The measured link loads are allocated among the traffic flows between nodes to at least a given allocation efficiency criteria by solving a system of linear equations with an objective of minimizing a difference between the assigned gravities and the resultant gravities corresponding to the determined flows.

62 Claims, 3 Drawing Sheets

U.S. PATENT DOCUMENTS

| | | | |
|---|---|---|---|
| 7,869,359 B2 * | 1/2011 | Kohler et al. | 370/231 |
| 2002/0101821 A1 | 8/2002 | Feldmann et al. | |
| 2002/0103631 A1 | 8/2002 | Feldmann et al. | |
| 2004/0044759 A1 * | 3/2004 | Padmanabhan et al. | 709/223 |
| 2004/0218529 A1 | 11/2004 | Rodosek et al. | |
| 2006/0077907 A1 * | 4/2006 | Rabinovitch et al. | 370/254 |

FOREIGN PATENT DOCUMENTS

| | | |
|---|---|---|
| EP | 92306698.9 | 5/1993 |

OTHER PUBLICATIONS

Zhang et al; Fast Accorate Computation of Large-Scale ip Traffic Matrices From Link Load; Sigmetrics '03, Jun. 10-14, 2003; San Diego, CA, USA.

Gunnar, Anders, et al; Traffic Matrix Estimation on a Large IP Backbone—A Comparison on Real Data; IMC 2004.

Goldschmidt, O.; ISP Backbone Traffic Inference Methods to Support Traffic Engineering; ISMA 2000.

* cited by examiner

TRAFFIC FLOW INFERENCE BASED ON LINK LOADS AND GRAVITY MEASURES

This application claims the benefit of U.S. Provisional Patent Application 60/803,759, filed 2 Jun. 2006.

BACKGROUND AND SUMMARY OF THE INVENTION

This invention relates to the field of network analysis, and in particular to a system and method for determining a traffic flow between pairs nodes of a network based on the amount of traffic on links (link loads) within the network.

The effective management of a network requires an understanding of traffic patterns within the network. Of particular significance is the traffic flow between pairs of nodes in the network. If it is known, for example, that two nodes exchange large amounts of data, it would be beneficial to provide a wide bandwidth channel between these nodes. Correspondingly, significant network resources need not be allocated to channels between nodes that rarely communicate with each other.

Network analysis tools, such as network simulators, often use the traffic flow between nodes to use the typical or expected behavior of the nodes to facilitate such tasks as network planning, congestion analysis, performance diagnostics, 'what-if' analyses, and so on.

Generally, network devices that facilitate the transfer of messages across a network, such as routers and the like, include management/diagnostic reporting functions that are configured to report traffic statistics, such as the amount of data received and/or transmitted by the device. Special purpose devices, such as network 'sniffers' and the like, can be configured to collect details regarding the data being transferred, including, for example, the source and destination nodes of the data being transferred, but it is generally infeasible to provide such devices at each node of the network. Therefore, in a typical network environment, the amount of data communicated on links between nodes, herein termed link loads, can generally be obtained from the devices at each node, whereas the details regarding the origination and termination of the data being communicated on the links, herein termed traffic flow, is generally unknown, or only partially known.

A variety of techniques have been proposed for determining traffic flow based on link loads, commonly termed "loads-to-flow" processes. Given the amount of data originated and terminated at each node, the loads on the links between the nodes can generally be determined and/or estimated directly, based on factors such as the bandwidth between nodes, and so on. However, deducing the particular origination and termination of the traffic based on the amount of data flowing into and out of each node is not as straightforward, because it is difficult to distinguish data that merely passes through the node from data that is originated and/or terminated at the node.

Yin Zhang et al. have proposed, in "FAST ACCURATE COMPUTATION OF LARGE-SCALE IP TRAFFIC MATRICES FROM LINK LOADS", at *SIGMETRICS* '03, Jun. 10-14, 2003, in San Diego, Calif., for example, the estimation of traffic flow between nodes based on "tomogravity", which is a combination of tomographic and gravity-based estimation techniques. In Zhang's approach, a node's 'gravity' is based on the amount of traffic received at and/or transmitted from each 'edge' node, an edge node being defined as a node that is directly coupled to one or more devices that either originates or terminates traffic. That is, nodes that receive and/or transmit a significant amount of data are likely to originate or terminate traffic to and from each other. Zhang acknowledges that such a definition of 'gravity' leads to some inconsistencies ("outliers"), particularly at nodes that primarily serve to pass data from one link to another, such as a node used to provide access to a transoceanic channel. Zhang teaches techniques for identifying such outliers and eliminating them from the loads-to-flow determination based on the overall quantity of data received at, and/or transmitted from, each node. Thereafter, tomographic techniques are used to provide consistency among the flow estimates.

Goldschmidt has proposed, in "ISP BACKBONE TRAFFIC INFERENCE METHODS TO SUPPORT TRAFFIC ENGINEERING", at *ISMA* 2000, the use of a linear programming model to determine the traffic flow between nodes based on the given constraints (measured parameters) and an objective function that is based on the number of hops between each pair of nodes in the network. The premise of this technique is that nodes that are closely linked (few hops) are more likely to communicate with each other than nodes that are distantly linked (many hops). Although this premise is generally true for 'engineered networks' that are designed to effect such close coupling between nodes that commonly communicate with each other, or on 'geographic networks' with nodes distributed to link geographic areas, because the amount of traffic between nodes is often correlated to the distance between nodes (e.g. a person is more likely to communicate with a person in the same country than in a distant country), it may not be true for many other networks.

Often, the results of the above algorithms for determining traffic flow between nodes based on link loads are inconsistent with a user's expectations and/or assumptions. For example, a geographic/number-of-hops based algorithm fails to appreciate that the amount of commercial traffic flow between Chicago and New York is likely to be greater than the amount of traffic between Chicago and any of the locales at the nodes forming the links between Chicago and New York. In like manner, a node at a financial institution in New York with offices in Chicago and London may exhibit the same 'outlier' characteristics as a node in New York that provides a general-purpose link to London, even though the financial institution in New York may be generating and terminating most of the traffic. On the other hand, a network manager would generally be able to characterize each of the nodes of interest in a network relative to the likelihood of traffic being originated and/or terminated (sourced and/or sunk) at the node.

It would be advantageous to provide a determination of traffic flow between nodes of a network based on a 'soft' definition/assignment of gravity measures to nodes of a network, so as to facilitate traffic flow determinations using gravity measures that are based on 'soft' data, such as estimates based on demographics, informed guesses, past experiences, and so on, rather than, or in addition to, gravity measures that are algorithmically generated based on 'hard' data. It would also be advantageous to provide an interactive user interface that facilitates the input of such soft gravity measures, and the display of the resultant determined traffic flow, as well as facilitating the optional refinement of the gravity measures, based on the determined resultant flow.

These advantages, and others, can be realized by using the defined gravity measures to form 'objectives' that are to be optimized within a given set of constraints, rather than as one or more of the constraints that are to be imposed on the solution set. In a preferred embodiment, the determined traffic flow between nodes is constrained so as not to exceed the amount of measured traffic on each link between the nodes, while at the same time optimized to minimize a difference between the specified gravity at each node and the gravity resulting from the determined traffic flow. The specified gravities and measured link loads are used to form a set of linear equations that are processed to effect the optimization defined by the specified gravities, subject to the link load constraints. The determined traffic flows are presented to a user via a graphic user interface, using color and other graphic features to facilitate visualization of the traffic flows.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1A:
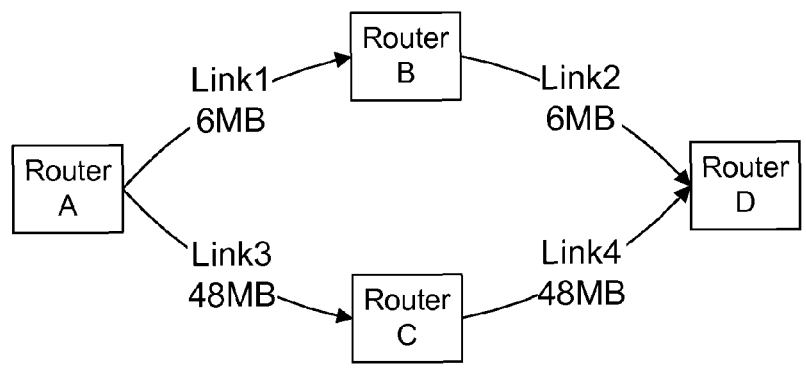
FIG. 1A illustrates an example network with measured link loads between nodes.

FIG. 1A illustrates an example network comprising nodes/routers A-D and links 1-4 between the nodes. Also illustrated in FIG. 1A is the amount of traffic flowing on each of the links 1-4, herein termed link loads. For ease of explanation and understanding, the example network is a 'one-way' network, wherein traffic flows in one direction (left to right in FIG. 1A). One of skill in the art will recognize that the principles and techniques presented herein can be, and typically is, applied in each direction.

These link loads can typically be obtained by querying each of the routers for the amount of data being received and/or transmitted during a given period of time. Other methods of determining link loads may be used, including estimating loads based on heuristics, deduced from related data, and so on. For example, if the load on a particular link cannot be measured, it may be estimated based on loads of links providing or receiving traffic to or from this link. Because loads vary with time, the techniques disclosed herein may be repeated at different times to provide data for time-dependent traffic flow determinations; however, for ease of presentation, the invention is described herein using a single set of link loads measured and/or estimated for a particular time period. For ease of reference, the term 'measured link load' is defined hereinafter as including both measured and estimated link loads.

As illustrated in FIGS. 1B-1E, a variety of traffic flows between pairs of nodes in the network may correspond to the given set of link loads.

Figure 1B:
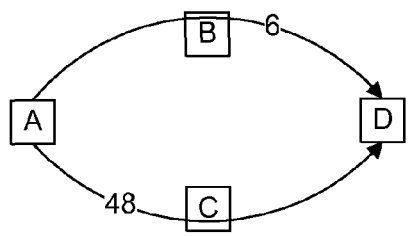
FIGS. 1B-1E illustrate example node-to-node traffic flows consistent with these example link loads.

In FIG. 1B, the 6 MB of traffic on links 1 and 2, for example, corresponds to traffic that is communicated from router A to router D, via router B. That is, the traffic flow from router A to router B over the route defined by links 1 and 2 amounts to 6 MB, and corresponds to the measured load on each of these links. In like manner, 48 MB of traffic flows from router A to router D via links 3 and 4, corresponding to the entirety of the traffic on these links. In FIG. 1B, no traffic is generated or terminated at routers B or C.

Figure 1C:
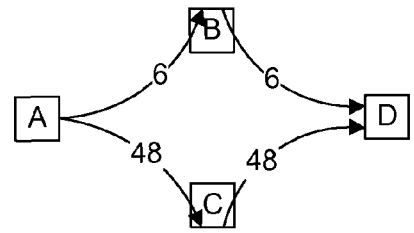

A very different traffic flow pattern is illustrated in FIG. 1C. In FIG. 1C, the traffic flow between nodes A and B is illustrated to be 6 MB, and amounts to the entirety of the load on link 1. Similarly, 6 MB of traffic originates at node B and is terminated at node D, corresponding to the entirety of the load on link 2. In FIG. 1C, no traffic flows between nodes A and D.

Figure 1D:
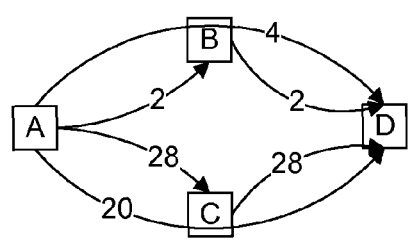

FIG. 1D illustrates a traffic flow between these extremes, wherein traffic flows from A to each of nodes B, C, and D, and from B to D, and C to D.

A network manager, knowing the characteristics of each node of a network, would be able to identify which of FIGS. 1B, 1C, or 1D more likely represents the flow of traffic in the network. If, for example, nodes A and D represent Chicago and New York, and nodes B and C represent nodes in Ohio and West Virginia, the flow illustrated in FIG. 1B would be a more accurate estimate of the traffic flow from Chicago than FIG. 1C.

From a gravity perspective, wherein gravity corresponds to a node's likelihood of generating (sourcing) or terminating (sinking) traffic, FIG. 1B illustrates a network wherein nodes A and D have high source and sink gravities, respectively, and nodes B and C have low gravities, such that all of the traffic flows from A to D, and no traffic is sourced or sunk at B and C. Conversely, FIG. 1C generally illustrates a network wherein each of the nodes has a 'balanced' gravity, such that each node sinks and sources all of the traffic flowing to and from the node, and no traffic passes through a node due to a higher gravity measure of a farther node. FIG. 1D illustrates a network with gravities between these extremes, wherein some traffic is sourced and sunk at the intermediate nodes B and C and some traffic from A to D flows through nodes B and C.

In a typical embodiment of this invention, the user is provided the opportunity to assign a relative gravity to each node of the network, and, based on these assigned gravities and the measured link loads, the system will attempt to estimate the traffic flow between individual nodes consistent with these gravity assignments. For example, in the aforementioned Chicago-New York network example, the network manager would assign node A a high source gravity, nodes B and C very low source and sink gravities, and node D a high sink gravity, based on the knowledge and/or assumption that Chicago is likely to generate a significant amount of traffic, and that New York is likely to be a destination of traffic flowing of the network. Given these gravity assignments, one would expect the determined flow to be similar to the flow illustrated in FIG. 1B.

The determination of traffic flow between nodes of a network is complicated by the fact that, generally, the information available is incomplete. Except in relatively small networks, the network configuration that is used to analyze a network is rarely a completely accurate representation of the network. Prominent nodes and links will generally be included in the model, but relatively insignificant nodes and spurs may not be included. In like manner, the configuration and other parameters associated with prominent nodes and links may be continually updated, whereas the information associated with insignificant nodes may only be updated at infrequent intervals.

Figure 1E:
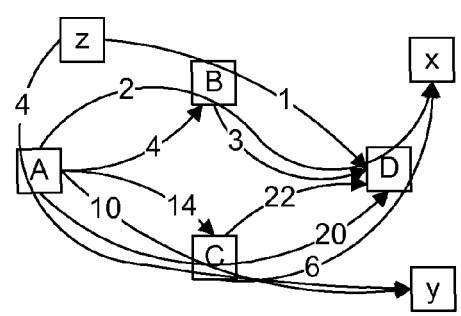

Because of the lack of complete and/or accurate information, the amount of measured traffic flowing on the links may not correspond solely to the traffic flow between the nodes of the modeled network. FIG. 1E, for example, illustrates the existence of nodes x, y, and z in the actual network that are not included in the modeled system of FIG. 1A. Node z, for example, places 1 MB of traffic on the link from B to D, and 4 MB on the link from A to C. Node x, on the other hand, is the recipient (sink) of 2 MB of traffic from node A, and 6 MB of traffic from node C. This traffic is included in the measured link load on each of the links, but does not correspond to traffic flow between the modeled nodes A, B, C, and D.

In a preferred embodiment of this invention, the user is also provided the option of specifying how much of the measured link loads must be allocated to the determined traffic flows. Generally, this parameter is dependent upon the assumed accuracy of the modeled network. If all of the possible sources and sinks are modeled, and the link loads are assumed to be accurate, then all of the link loads should be allocatable to the sources and sinks. If, on the other hand, a degree of error is assumed, the user may be satisfied with an allocation of, for example, ninety percent of the link loads to the sources and sinks.

As noted above, the gravity measures associated with each node are estimates of each node's likelihood of sourcing or sinking traffic. These estimates may be based, for example, on the demographics of the area served by the node, including the number of people served, types of businesses served, and so on. Alternatively, or additionally, the estimates may be based on prior flow estimates and/or parameters that are typically correlated with traffic flow, such as network interface bandwidths, link bandwidths, link loads, including link load gradients at each node, and so on.

In a preferred embodiment of this invention, because the gravity measures are generally heuristic estimates, rather than absolutes, the gravity measures are used to guide and/or influence the determination of traffic flows to generally conform to these gravity measures, rather than forcing the traffic flows to conform to these measures. To effect this guidance/influence, the gravity measures are used to define an objective function in a system of linear equations. This objective function is constructed to allocate the link loads among the possible traffic flows while minimizing the difference between the assigned gravity measures and the resultant gravity measures based on the allocated traffic flows.

Figure 2:
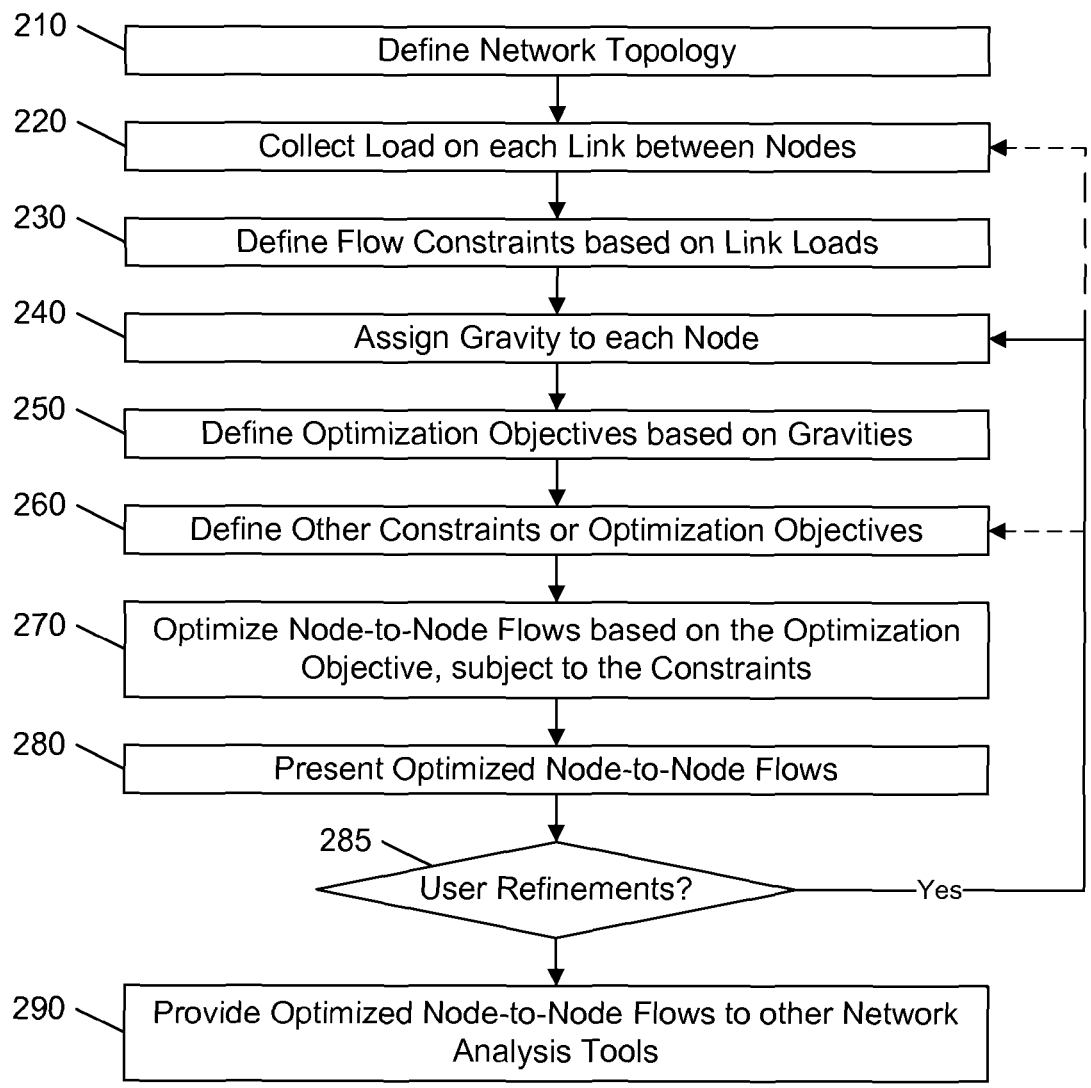
FIG. 2 illustrates an example flow diagram for determining traffic flow between nodes in accordance with an aspect of this invention.

FIG. 2 illustrates an example flow diagram for determining traffic flow between nodes based on measured link loads and assigned gravity measures.

At 210, the network topology is determined, to define the nodes and links that form the network. This may be a manual or automated process, and is often the combination of both. Optionally, for example, the network can be queried to identify each router in the network and its corresponding routing table and other parameters, from which the topology can be deduced. These same routers may subsequently be queried to determine the cumulative load on each of the links. In this example, each router is considered a node of the network. The local devices that are supported by a router, typically coupled by a subnetwork of the router, form the sinks and sources of traffic flow from and to the router.

To facilitate the assignment of gravity measures to the nodes, nodes that do not support local subnetworks are identified and marked as having no likelihood of sourcing or sinking traffic flow. In like manner, sink-only nodes, such as a router that couples network traffic to a bank of printers, are identified as having little or no likelihood of sourcing traffic, and source-only nodes, such as a router that supports data collection devices, are identified as having little or no likelihood of sinking traffic. As noted, this classification of nodes may be performed manually, automatically, or as a combination of both.

At 220, the link loads are measured or otherwise determined for each link in the network. Generally, this is an automated process, wherein each node is queried to report its load over a given time interval, using conventional network management tools, such as SNMP, MRTG, CA ehealth, InfoVista, HP Openview, and so on. If the load cannot be measured directly, or if the load is hypothetical, such an estimated load in a "what-if?" scenario, the user is provided the option of entering the estimated load directly, including replacing the measured load.

At 230, the link loads are used to define linear equations that constrain the subsequent allocation and optimization task. Referring to FIG. 1A, there are five possible traffic-flows (as noted above, the example network is uni-directional, from left to right):

$f_{AB}$—Traffic flow from Node A to Node B;
$f_{AC}$—Traffic flow from Node A to Node C;
$f_{AD}$—Traffic flow from Node A to Node D (via either B or C);
$f_{BC}$—Traffic flow from Node B to Node D; and
$f_{CD}$—Traffic flow from Node C to Node D.

Link 1, between A and B, must pass all of the traffic between A and B, and its share of the traffic from A to D. Generally, the split of traffic among the different paths between two nodes will be dependent upon the 'metrics' associated with each path, and can be estimated using conventional tools of the art. In this example, because the path from A to D via either B or C is of equal length (two hops), the traffic from A to D will be assumed to split equally over the link 1 to link 2 path (A to B to C) and the link 3 to link 4 path (A to C to D). Therefore, Link 1 will carry all of the traffic from A to B, and half of the traffic from A to D. In like manner, Link 2 will carry half of the traffic from A to D, and all of the traffic from B to D; and so on for the other links 3 and 4. Using the terms L1, L2, L3, L4 to represent the corresponding link loads, the above relationships can be expressed as:

$$L1 \geq 1.0*f_{AB} + 0.0*f_{AC} + 0.5*f_{AD} + 0.0*f_{BD} + 0.0*f_{CD};$$

$$L2 \geq 0.0*f_{AB} + 0.0*f_{AC} + 0.5*f_{AD} + 1.0*f_{BD} + 0.0*f_{CD};$$

$$L3 \geq 0.0*f_{AB} + 1.0*f_{AC} + 0.5*f_{AD} + 0.0*f_{BD} + 0.0*f_{CD}; \text{ and}$$

$$L4 \geq 0.0*f_{AB} + 0.0*f_{AC} + 0.5*f_{AD} + 0.0*f_{BD} + 1.0*f_{CD}.$$

The greater-than relationship is included to accommodate additional flows on the measured links from other nodes that may not be included in the model, as discussed above with regard to FIG. 1E.

At 240, gravity measures are assigned to each node. As discussed above, these measures are typically assigned manually, based on demographics or other factors that would suggest the relative likelihoods of each node being a source or sink of traffic. In a preferred embodiment, the user is provided the option of specifying relative gravity measures, or gravity weights, to each node, and the system is configured to assign gravity measures to each node that the user omits. Any of a variety of techniques can be used for generating gravity measures for omitted nodes. For example, in a straightforward embodiment, the user may identify each node having high or low gravities, and the system may assign an average gravity to the remainder; or, the user may identify only the high gravity nodes, and the system may assign low gravity to the remainder. In another embodiment, the system may assign gravities based on other factors, such as link loads at the node, differential link loads at the node, prior traffic flows, and so on. In a more complex embodiment, the system may include an expert system or a learning system that is configured to deduce an appropriate assignment of gravity based on correlations or patterns of prior user assignments.

At 250, these measures are used to define objective functions for solving the system of linear equations that include the above link load constraints. Two sets of equations are provided, one set that addresses the source of traffic flows, and another set that addresses the sink of traffic flows. Given a relative source (originating) gravity $go_i$ associated with each $node_i$, a normalized source gravity constant $Ko_i$, a proportion between 0 and 1, can be defined as:

$$Ko_i = \frac{go_i}{\sum_{j \in S} go_j}.$$

In the ideal case, the amount of traffic sourced from each $node_i$ should be proportional to this normalized source gravity constant:

$$Ko_i = \frac{go_i}{\sum_{j \in S} go_j} = \frac{To_i}{\sum_{j \in S} To_j} = \frac{\sum_{o \in O_i} f_o}{\sum_{j \in S} \sum_{o \in O_j} f_o}, \quad (1)$$

where $To_i$ is the total traffic sourced from $node_i$, S is the set of all nodes, $O_i$ is the set of flows originating from $node_i$, and $f_o$ is the particular traffic flow. For example, the set of flows originating from node A is the flow from A to B ($f_{AB}$), A to C ($f_{AC}$), and A to D ($f_{AD}$); the set of flows originating from node B is the single flow from B to D ($f_{BD}$); and the set of flows originating from node C is the single flow from C to D ($f_{CD}$).

The above ideal relation between the normalized source gravity and the flows for each node can be rewritten as:

$$Ko_i \sum_{j \in S; j \neq i} \sum_{o \in O_j} f_o - (1 - Ko_i) \sum_{o \in O_i} f_o = 0.$$

As noted above, this equation represents the ideal case wherein the allocation of flows corresponds exactly to the gravity measure for the given $node_i$. Any difference from zero in the left side of the above equation corresponds to a difference between the allocation of flows and the ideal allocation. Thus, an objective function can be stated as:

$$\text{Minimize} \left| Ko_i \sum_{j \in S; j \neq i} \sum_{o \in O_j} f_o - (1 - Ko_i) \sum_{o \in O_i} f_o \right|,$$

which, in the form of a set of linear equations can be stated as:

$$\text{Minimize } Ko_i \sum_{j \in S; j \neq i} \sum_{o \in O_j} f_o - (1 - Ko_i) \sum_{o \in O_i} f_o; \text{ and} \quad (2a)$$

$$\text{Minimize } -Ko_i \sum_{j \in S; j \neq i} \sum_{o \in O_j} f_o + (1 - Ko_i) \sum_{o \in O_i} f_o. \quad (2b)$$

In like manner, defining $Ke_i$ as the normalized sink (ending) gravity, and $E_i$ as the set of flows that are sunk (end) at each $node_i$, a corresponding set of objective functions can be stated as:

$$\text{Minimize } Ke_i \sum_{j \in S; j \neq i} \sum_{e \in E_j} f_e - (1 - Ke_i) \sum_{e \in E_i} f_e; \text{ and} \quad (3a)$$

$$\text{Minimize } -Ke_i \sum_{j \in S; j \neq i} \sum_{e \in E_j} f_e + (1 - Ke_i) \sum_{e \in E_i} f_e. \quad (3b)$$

For example, the set of ending flows for node B is the single flow from A to B ($f_{AB}$); the set of ending flows for node C is the single flow from A to C ($f_{AC}$); and the set of ending flows for node D is the flow from A to D ($f_{AD}$), the flow from B to D ($f_{BD}$), and the flow from C to D ($f_{CD}$).

At 260, other constraints and/or objective functions may be added. As noted above, in the ideal case all of the link loads will be allocated among the defined flows; however, because the link loads may include traffic from undefined nodes, the allocation may not be totally efficient. In an example embodiment, the user is provided an option of specifying how much of the link load must be allocated to the defined flows. The user specifies a proportion, c, of the total load that must be allocated, and this proportion is used to define a corresponding allocation efficiency constraint:

$$1.0^* f_{AB} + 1.0^* f_{AC} 2.0^* f_{AD} + 1.0^* f_{BD} + 1.0^* f_{CD} \geq c^* \Sigma \text{Loads}.$$

The left side of the equation is the total flow; the factor of 2.0 for the flow from A to D is due to the fact that the flow appears on two links between A and D (regardless of the path used). That is, the link load produced by a given flow is equal to the amount of flow multiplied by the number of hops.

One of skill in the art will recognize that additional constraints and/or objectives can be added as desired. For example, if it is likely that at least half the flow from node A will be destined for node D, the following example constraint can be added:

$$1.0^* f_{AD} - (1.0^* f_{AB} + 1.0^* f_{AC}) \geq 0.$$

Care should be taken to avoid constraints that overconstrain the system such that no feasible solution can be found. In a preferred embodiment, if a solution is not found after some maximum reasonable limit, the system will prompt the user to eliminate or reduce these additional constraints. Alternatively, the system may be configured to avoid such overconstraints where feasible. For example, in the above allocation-efficiency constraint situation, the system may be configured to first determine a maximum allocation-efficiency without consideration of gravity measures. Thereafter, when a user specifies an acceptable conversion efficiency as a proportion, c, the proportion is considered to be relative to the maximum achievable allocation efficiency, and not relative to an unachievable ideal allocation. That is, if the maximum achievable allocation efficiency is 90 percent of the total load, and the user identifies an acceptable proportion of 80 percent [of the maximum achievable efficiency], the constraint will be structured to assure that the solution achieves at least 72 percent of the total load (0.80*0.90*Sum(Loads)).

The following table illustrates the coefficients of the system of linear equations corresponding to the above link constraints, flow allocation objectives, and allocation efficiency constraints.

|  | $f_{AB}$ | $f_{AC}$ | $f_{AD}$ | $f_{BD}$ | $f_{CD}$ | oA | oB | oC | eA | eB | eC |  |
|---|---|---|---|---|---|---|---|---|---|---|---|---|
| Max | 0 | 0 | 0 | 0 | 0 | −1 | −1 | −1 | −1 | −1 | −1 |  |
| L1 | 0 | 0.5 | 0 | 0 | 0 | 0 | 0 | 0 | 0 | 0 | 0 | $\leq 6$ |
| L2 | 0 | 0 | 0.5 | 1.0 | 0 | 0 | 0 | 0 | 0 | 0 | 0 | $\leq 6$ |
| L3 | 0 | 1.0 | 0.5 | 0 | 0 | 0 | 0 | 0 | 0 | 0 | 0 | $\leq 48$ |
| L4 | 0 | 0 | 0.5 | 0 | 1.0 | 0 | 0 | 0 | 0 | 0 | 0 | $\leq 48$ |
| Ao+ | $Ko_A - 1$ | $Ko_A - 1$ | $Ko_A - 1$ | $Ko_A$ | $Ko_A$ | −1 | 0 | 0 | 0 | 0 | 0 | $\leq 0$ |
| Ao− | $1 - Ko_A$ | $1 - Ko_A$ | $1 - Ko_A$ | $-Ko_A$ | $-Ko_A$ | −1 | 0 | 0 | 0 | 0 | 0 | $\leq 0$ |
| Bo+ | $Ko_B$ | $Ko_B$ | $Ko_B$ | $Ko_B - 1$ | $Ko_B$ | 0 | −1 | 0 | 0 | 0 | 0 | $\leq 0$ |
| Bo− | $-Ko_B$ | $-Ko_B$ | $-Ko_B$ | $1 - Ko_B$ | $-Ko_B$ | 0 | −1 | 0 | 0 | 0 | 0 | $\leq 0$ |
| Co+ | $Ko_C$ | $.Ko_C$ | $Ko_C$ | $Ko_C$ | $Ko_C - 1$ | 0 | 0 | −1 | 0 | 0 | 0 | $\leq 0$ |
| Co− | $-Ko_C$ | $-.Ko_C$ | $-Ko_C$ | $-Ko_C$ | $1 - Ko_C$ | 0 | 0 | −1 | 0 | 0 | 0 | $\leq 0$ |
| Be+ | $Ke_B - 1$ | $Ke_B$ | $Ke_B$ | $Ke_B$ | $Ke_B$ | 0 | 0 | 0 | −1 | 0 | 0 | $\leq 0$ |
| Be− | $1 - Ke_B$ | $-Ke_B$ | $-Ke_B$ | $-Ke_B$ | $-Ke_B$ | 0 | 0 | 0 | −1 | 0 | 0 | $\leq 0$ |
| Ce+ | $Ke_C$ | $Ke_C - 1$ | $Ke_C$ | $Ke_C$ | $Ke_C$ | 0 | 0 | 0 | 0 | −1 | 0 | $\leq 0$ |
| Ce− | $-Ke_C$ | $1 - Ke_C$ | $-Ke_C$ | $-Ke_C$ | $-Ke_C$ | 0 | 0 | 0 | 0 | −1 | 0 | $\leq 0$ |
| De+ | $Ke_D$ | $Ke_D$ | $Ke_D - 1$ | $Ke_D - 1$ | $Ke_D - 1$ | 0 | 0 | 0 | 0 | 0 | −1 | $\leq 0$ |
| De− | $-Ke_D$ | $-Ke_D$ | $1 - Ke_D$ | $1 - Ke_D$ | $1 - Ke_D$ | 0 | 0 | 0 | 0 | 0 | −1 | $\leq 0$ |
| eff | 1 | 1 | 2 | 1 | 1 | 0 | 0 | 0 | 0 | 0 | 0 | $\geq c * \Sigma L$ |

The first five columns correspond to each of the flows, whereas the remaining columns correspond to the differences between the assigned gravity and determined flows that are to be minimized. Typically, there would be two columns corresponding to each node, for each of the source and sink flows; in this uni-directional example, however, node A does not have a sink flow, and node D does not have a source flow.

At 270, the set of linear equations is solved, using conventional linear programming techniques. Given an assumption that each of the nodes have equal gravities (K..=0.25), solving the above set of example linear equations will result in allocated traffic flows as illustrated in FIG. 1C, because none of the nodes are assumed to source or sink more or less than its share of the observed load at the node. Conversely, if node A is assigned a high source-only gravity, e.g. $Ko_A=60$, $Ke_A=0$, and node D is assigned a high sink-only gravity, e.g. $Ko_D=0$, $Ke_D=60$, while nodes B and C are given relatively low sink and source gravities (K..=20), the allocated flows will be as illustrated in FIG. 1B. Gravity assignments between these extremes will produce different traffic flows, such as the traffic flow illustrated in FIG. 1D.

At 280, the determined traffic flows are presented to the user, preferably in graphic form to facilitate visualization of the traffic flow between nodes, as discussed further below.

One of skill in the art will recognize that the link load constraints would typically include loads in each direction between the nodes, and corresponding additional traffic flows (D to C, B, and A; B and C to A). The allocation of link load to each of the traffic flows is determined by adding the additional link load constraints and the objective function equations 2a, 2b, 3a, and 3b for these additional traffic flows to the above set of linear equations, and solving the equation subject to these constraints so as to minimize the cumulative difference between the assigned gravities for each node and the resultant gravities corresponding to the determined traffic flows.

In a preferred embodiment, the aforementioned cumulative difference is provided to the user as a qualitative 'score' of the correspondence between the assigned gravities and the determined flows. That is, as indicated by equation (1), above, if the allocation is perfect, the ratio of a node's source (or sink) gravity ($g_i$) to the total of all source (or sink) gravities should equal the ratio of the sum of flows ($fo_i$, $fe_i$) originating (or ending) at the $node_i$ to the total of flows originating (or ending) at all nodes, which equals the assigned gravity factor ($Ko_i$, $Ke_i$) for the node. For ease of reference, the ratio of the sum of flows ($fo_i$, $fe_i$) originating (or ending) at the $node_i$ to the total of flows originating (or ending) at all nodes is hereinafter termed the 'determined' gravity, or gravity from the determined flow.

In an example embodiment, each node's gravity score is based on the Euclidean distance between the specified sink and source gravities and the determined sink and source gravities at the node. The overall gravity score is based on a sum-of-squares of each node's gravity scores. In this example embodiment, a lower gravity score indicates a closer correspondence between the specified and determined gravities, although an inverse of such a score could be used to associate a higher score with a higher correspondence.

In a preferred embodiment, the user is provided the option of adding or modifying constraints or objectives, by looping, at 285, back to 260, refining the gravity estimates, by looping back to 240, and/or, if the measured loads had been estimated, by looping back to 220.

The aforementioned gravity 'score' serves a variety of purposes. Preferably, the score is normalized, for example to a range of 0 to 100, so that the scores achieved for different networks, or for different sets of constraints and objectives, can be compared. Additionally, by providing a normalized score, the user is provided a quantitative measure that indicates whether the achieved solution is "close enough" to a perfect correspondence between the specified and determined gravities, or whether additional effort should be devoted to improving the correspondence.

Generally, the aforementioned allocation efficiency and the above gravity score are inversely related to each other, and the solution will involve a tradeoff between the two. That is, if the user is willing to accept a lower allocation efficiency, the correspondence between specified and determined gravities is likely to be higher; if the user is willing to accept a lesser correspondence between the specified and determined gravities, a higher allocation efficiency can generally be achieved. By preferably providing a normalized gravity score and an allocation efficiency that is relative to a maximum achievable efficiency, the user is given measures that facilitate an assessment of the tradeoffs involved in deriving the solution.

In the network of FIG. 1A, for example, specifying an equal gravity measure for all of the nodes A, B, C, and D will result in the flow determination illustrated in FIG. 1C. This flow determination exhibits a high allocation efficiency, but a poor gravity score. The high allocation efficiency is derived from the fact that all of the observed load is allocated to the flow between nodes. The poor gravity score is derived from the fact that, for example, the determined sink gravity of node B (6 MB/108 MB) is substantially less than the derived sink gravity of node C (48 MB/108 MB), even though the gravities of all the nodes were specified to be equal. Similarly, the derived source gravity of node A (54 MB/108 MB) is substantially greater than the derived source gravity of nodes B (6 MB/108 MB) and D (0 MB/108 MB) and somewhat greater than the derived source gravity of node C (48 MB/108 MB), even though equal gravities were specified. On the other hand, if the specified source and sink gravities had corresponded to the flows of FIG. 1C, such as a specification that node A's sink gravity is zero, node D's source gravity is zero, node B's source and sink gravities are one-eighth of the source and sink gravities of node C, and so on, both a high allocation efficiency and a good gravity score would be achieved. Conversely, specifying that nodes B and C have equal gravities and allowing the allocation efficiency to be low, the determined source and sink flows from node C would be less than illustrated in FIG. 1C, resulting in a higher gravity score than that produced by the 'forced' high allocation efficiency provided by the determined flow of FIG. 1C. If the user "knows" that there should not be a great difference between the gravity measures of B and C, and is dissatisfied with the determined gravity measures, the user can adjust the specified gravity measures of nodes A and D and/or the minimum required allocation efficiency until a desired gravity score is achieved, even though such a solution might imply the presence of unknown sources and sinks of traffic, such as illustrated by nodes x, y, and/or z in FIG. 1E.

When the user is satisfied with the determined traffic flows, the flows are preferably saved for use by other network analysis tools, such as a flow analyzer, a network simulator, and the like, at 290.

Figure 3:
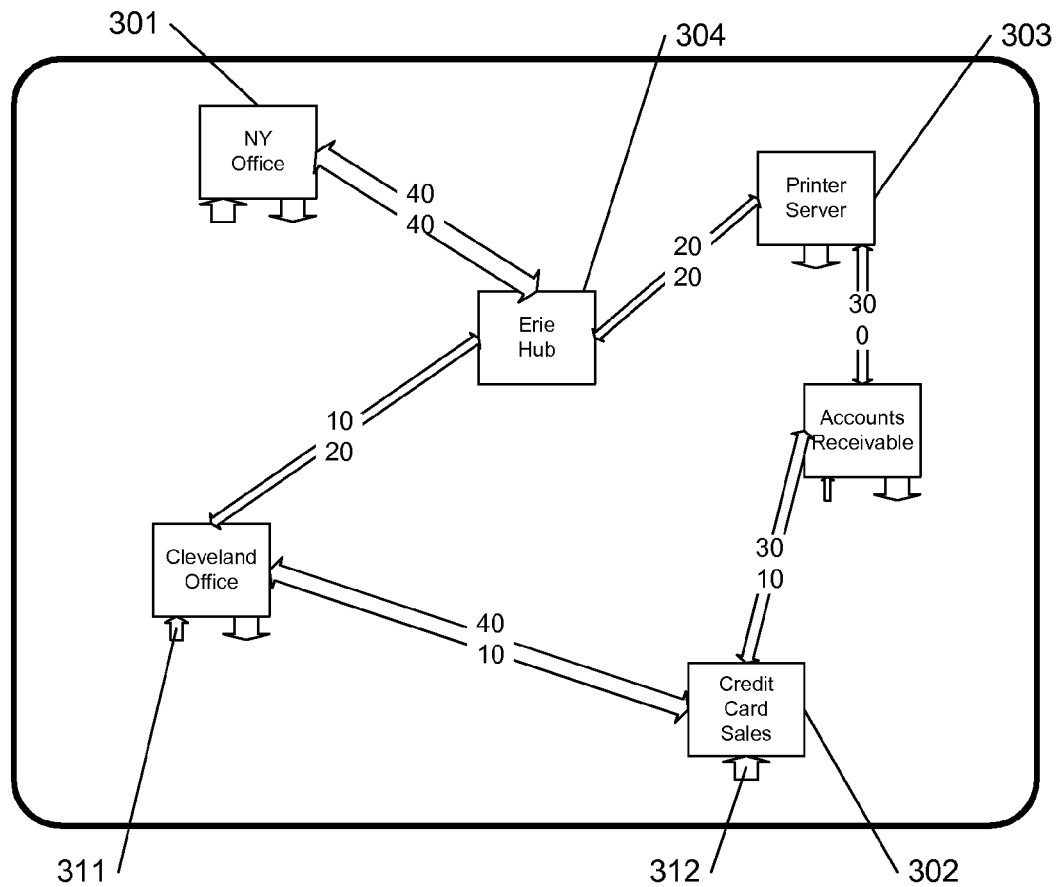
FIG. 3 illustrates an example presentation of traffic flows in accordance with an aspect of this invention.

FIG. 3 illustrates an example display of link loads and determined traffic flows via a graphic interface.

Figure 4:
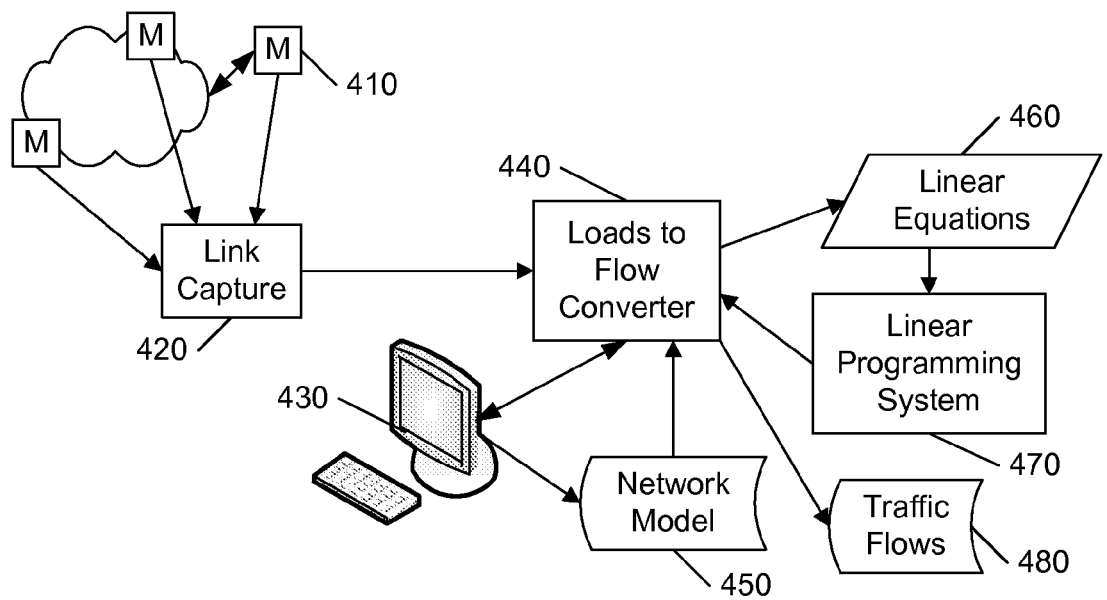
FIG. 4 illustrates an example block diagram of a system for determining traffic flow between nodes in accordance with an aspect of this invention.

In a preferred embodiment of this invention, graphic characteristics are used to convey the information, to facilitate a visualization of the network and the determined traffic flows. For example, as noted above, the nodes of the network may be classified based on their source and sink capabilities. Different icons are preferably used to each class of nodes, such as example icons 301, 302, 303, and 304, which each illustrate a different combination of flows into each node from the subnetwork supported by the node and out from each node into the supported subnetwork by arrows at the bottom of each icon. An arrow at the bottom on a node icon that indicates traffic flowing into the node (from its subnetwork components) indicates source traffic that correspondingly flows into the network; an arrow at the bottom of the node that indicates traffic flowing out from the node (to its subnetwork components) indicates sink traffic that correspondingly flows out from the network. In FIG. 4, icons 301, 302, 303, and 304 correspond to a source and sink node, a source-only node, a sink-only node, and a node that is neither a sink nor source, respectively. In like manner, the size of the node icon, or the size of a feature of the node icon, is preferably based on the gravity associated with the node, as illustrated by the relative size difference between the source arrows 311 and 312. The node icons are preferably placed on the screen so as to minimize the complexity of the display or overlaid on a map based on the node's geographic location.

The links between nodes are illustrated as lines between the nodes, and the width of the line is preferably based on the amount of traffic on the link, or based on the amount of unallocated link load, or other characteristics of the link. Optionally, the amount of right-to-left and left-to-right traffic, or unallocated traffic, can be presented in text boxes on each line, as illustrated, or displayed in a 'tool-tip' that is displayed when the link is selected, or as the mouse pointer overlays the link. Similarly, a detailed text block can be provided that displays the individual determined traffic flows on the selected link, as well as other parameters associated with the link, such as its bandwidth, data rate, ports used, and so on. Depending upon the information provided, the text boxes may be interactive, and coupled to the graphics display. For example, in a preferred embodiment, the path from the source node to the destination node corresponding to each traffic flow is graphically illustrated upon selection of the particular flow entry in the text box, using highlighting and other graphic techniques common in the art.

Colors are preferably also used to indicate the results of the allocation of traffic flows. A color, such as green, may be used to indicate a close correspondence between the determined flows and the assigned gravity measures, while another color, such as red, can be used to indicate a lack of correspondence. Such a color scheme can be used to indicate correspondences at each of the links and at each node. That is, when the user specifies an allocation efficiency below 100%, the inefficiency is typically not uniformly distributed among the links. If the load on a particular link is not sufficiently allocated among the traffic flows, the line representing the link is appropriately colored to indicate this sub-allocation. The threshold for identifying a sub-allocation may be fixed or variable, such as a percent deviation from the average allocation of the other links. Alternatively, different colors or hues may be associated with different ranges of allocation efficiency. In like manner, each node may be colored based on the difference between the measured source and sink flows at the node and the flows expected based on its assigned gravity.

One of skill in the art will recognize that various combinations of line widths, colors, and other graphic features can be used to represent different combinations of parameters associated with the links and nodes. For example, the width of the link may be based on the amount of unallocated load, while the color may represent the proportion of the total load that is unallocated. Depending upon the parameter being displayed, the selected color or width may be based on a peak value, an average value, a variance, and so on.

FIG. 4 illustrates an example block diagram of a system for allocating link loads to traffic flows in accordance with this invention. A link capture element 420 communicates with one or more monitors 410 that are configured to monitor link loads. As noted above, alternatively or additionally, a user can manually enter measured or estimated link loads, via a user interface 430.

A loads-to-flow converter element 440 is configured to obtain the link loads and the gravity measures. As discussed above, the gravity measures are typically provided via a user interface 430, and the loads-to-flow converter 440 may be configured to provide gravity measures for nodes that the user omits. The converter 440 processes the assigned gravity measures to determine an assigned gravity factor K, or other normalized factor, for the cumulative source and sink flows at each node. Using the relationships/connectivity among the nodes and links, which can be determined from a network model 450, or directly via the user interface 430, the converter 440 provides the parameters of the constraints and objective function to a form a system of linear equations 460. As discussed above, the converter 440 allows the user to add other constraints and objective functions to this linear system 460.

A linear programming system 470 solves the set of linear equations subject to the constraints imposed by the link loads and other factors, while optimizing the allocation of traffic flows between nodes to minimize a difference between the assigned gravity factor and the gravity factor provided by the determined traffic flows. The loads-to-flow converter 440 provides the determined solution via the user interface 430, preferably in graphic form to facilitate visualization of the traffic flow within the modeled network. Optionally, the user may modify any of the aforementioned input items and re-run the conversion/allocation process. Upon completion, the converter stores the determined traffic flows 480, and optionally, any data related to these flows, such as the constraints and objectives applied, for use by other network analysis tools.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method determining traffic flows among nodes of a network, comprising:
    determining, by a network analysis system, a plurality of links among the nodes of the network,
    determining, by the network analysis system, a link load associated with each link of the plurality of links,
    assigning, at the network analysis system, one or more gravity measures to each node of the network,
    determining, by the network analysis system, the traffic flow between each pair of nodes of the network based on the link loads and the gravity measures, and
    presenting, at the network analysis system, some or all of the traffic flow to a user;
    wherein
    determining the traffic flows includes:
        defining an objective function of a system of equations based on the gravity measures,
        defining constraints of the system based on the link loads, and
        solving the system of equations so as to optimize the objective function subject to the constraints.

2. The method of claim 1, wherein the system of equations comprises a system of linear equations.

3. The method of claim 1, wherein a plurality of the one or more gravity measures are user-defined.

4. The method of claim 1, including defining a target allocation efficiency measure corresponding to an amount of the link load that is to be allocated among the traffic flows, and defining one or more constraints on the system of equations based on the target allocation efficiency.

5. The method of claim 1, wherein the gravity measures are relative measures corresponding to each node's capacity to source traffic and to sink traffic.

6. The method of claim 1, including receiving user input relative to proposed gravity measures, preprocessing the user input to identify inconsistencies among the proposed gravity measures, and providing notification of the inconsistencies.

7. The method of claim 6, wherein the user input includes a definition of one or more weights associated with the nodes of the network.

8. The method of claim 6, wherein the user input includes a relative measure of at least one node's ability to sink traffic and to source traffic.

9. The method of claim 1, wherein assigning the one or more gravity measures to a plurality of the nodes of the network includes: estimating a population associated with each node of the plurality of nodes, and assigning the one or more gravity measures based on the populations.

10. The method of claim 1, wherein the one or more gravity measures of a plurality of the nodes are based on at least one of: prior flow estimates, network interface bandwidths, link bandwidths, and link loads.

11. The method of claim 1, wherein optimizing the objective function corresponds to a minimization of a difference between the one or more gravity measures and corresponding measures based on the determined traffic flow.

12. The method of claim 11, including determining a gravity score based on the difference, and reporting the gravity score to a user.

13. The method of claim 1, wherein optimizing the objective function corresponds to a minimization of a difference between the link loads and allocated amounts of load to traffic flow.

14. The method of claim 1, including providing a user interface that is configured to obtain user-defined source and sink weights from which a plurality of gravity measures are assigned.

15. The method of claim 14, including automatically generating a remainder of unassigned gravity measures after the plurality of gravity measures based on the user-defined source and sink weights, if any, are assigned.

16. The method of claim 14, including presenting the determined traffic flows via the user interface.

17. The method of claim 16, wherein presenting the determined traffic flows includes: displaying the links as lines, and providing a color of each line based on the determined traffic flows.

18. The method of claim 17, wherein determining the color is also based on the link loads.

19. The method of claim 16, wherein presenting the determined traffic flows includes a display of the links as lines, and determining a width of each line based on the determined traffic flows.

20. The method of claim 19, wherein determining the width is also based on the link loads.

21. The method of claim 16, including presenting a select icon corresponding to each node based on the one or more gravity measures.

22. The method of claim 21, wherein the select icon is selected based on whether the corresponding node is one of: a source only, a sink only, a source and sink, and neither a source nor sink.

23. The method of claim 16, including providing tool tips to facilitate display of data corresponding to the determined traffic flows.

24. The method of claim 1, including providing the determined traffic flows to a network analysis tool to facilitate analysis of the network.

25. The method of claim 1, wherein the objective function based on the gravity measures includes:

$$\text{Minimize } \left| Ko_i \sum_{j \in S; j \neq i} \sum_{o \in O_j} f_o - (1 - Ko_i) \sum_{o \in O_i} f_o \right|,$$

where $Ko_i$ corresponds to a source gravity measure associated with $node_i$, and $f_o$ corresponds to each flow of a plurality of flows $O_i$ originating from $node_i$.

26. The method of claim 25, wherein the objective function based on the gravity measures includes:

$$\text{Minimize } \left| Ke_i \sum_{j \in S; j \neq i} \sum_{e \in E_j} f_e - (1 - Ke_i) \sum_{e \in E_i} f_e \right|,$$

where $Ke_i$ corresponds to a sink gravity measure associated with $node_i$, and $f_e$ corresponds to each flow of a plurality of flows $E_i$ ending at $node_i$.

27. The method of claim 1, including obtaining measured traffic flow, and defining the constraints of the system based on the measured traffic flow.

28. A system comprising:
an input element that is configured to:
receive a link load associated with each link of a plurality of links of a network, and
receive a plurality of gravity measure corresponding to a plurality of the nodes of the network by:
a load to flow converter that is configured to determine traffic flows between pairs of nodes of the network by:
defining an objective function of a system of equations based on the gravity measures,
defining constraints of the system based on the link loads, and
solving the system of equations so as to optimize the objective function subject to the constraints;
wherein the loads to flow converter is configured to present some or all of the determined traffic flows via a user interface device.

29. The system of claim 28, wherein the system of equations comprises a system of linear equations.

30. The system of claim 28, wherein the input element is configured to receive a target allocation efficiency measure corresponding to an amount of the link load that is to be allocated amongst the traffic flows, and the loads to flow converter is configured to define one or more constraints on the system of equations based on the target allocation efficiency.

31. The system of claim 28, wherein the gravity measures are relative measures corresponding to each node's capacity to source traffic and to sink traffic.

32. The system of claim 28, wherein optimizing the objective function corresponds to a minimization of a difference between the one or more gravity measures and corresponding measures based on the determined traffic flow.

33. The system of claim 32, wherein the loads to flow converter is configured to: determine a gravity score based on the difference, and report the gravity score to a user.

34. The system of claim 28, wherein optimizing the objective function corresponds to a minimization of a difference between the link loads and allocated amounts of load to traffic flow.

35. The system of claim 28, including a user interface that is configured to: obtain user-defined source and sink weights and
determine at least some of the plurality of gravity measures based on the user-defined source and sink weights.

36. The system of claim 35, wherein the loads to flow converter is configured to automatically generate a remainder of unassigned gravity measures after the plurality of gravity measures based on the user-defined source and sink weights, if any, are determined.

37. The system of claim 28, wherein the user interface presents the determined traffic flows by: displaying the links as lines, and providing at least one of a color and a width of each line based on the determined traffic flows.

38. The system of claim 37, wherein at least one of the color and the width is also based on the link loads.

39. The system of claim 28, wherein the user interface is configured to present a select icon corresponding to each node based on the one or more gravity measures.

40. The system of claim 28, wherein the objective function based on the gravity measures includes:

$$\text{Minimize } \left| Ko_i \sum_{j \in S; j \neq i} \sum_{o \in O_j} f_o - (1 - Ko_i) \sum_{o \in O_i} f_o \right|,$$

where $Ko_i$ corresponds to a source gravity measure associated with $node_i$, and $f_o$ corresponds to each flow of a plurality of flows $O_i$ originating from $node_i$.

41. The system of claim 40, wherein
the objective function based on the gravity measures includes:

$$\text{Minimize } \left| Ke_i \sum_{j \in S; j \neq i} \sum_{e \in E_j} f_e - (1 - Ke_i) \sum_{e \in E_i} f_e \right|,$$

where $Ke_i$ corresponds to a sink gravity measure associated with $node_i$, and $f_e$ corresponds to each flow of a plurality of flows $E_i$ ending at $node_i$.

42. The system of claim 28, including one or more link capture elements that are configured to provide a measure of the link loads on one or more of the links.

43. A computer program on a non-transitory computer-readable medium that is configured to cause a processor to:

receive a link load associated with each link of a plurality of links of a network, receive a plurality of gravity measures corresponding to a plurality of the nodes of the network, define an objective function of a system of equations based on the gravity measures, define constraints of the system based on the link loads, solve the system of equations to provide a set of traffic flows between pairs of the nodes of the network so as to optimize the objective function subject to the constraints, and present some or all of the determined traffic flows via a user interface.

44. The computer program of claim 43, wherein the system of equations comprises a system of linear equations.

45. The computer program of claim 43, wherein the computer program causes the processor to: receive a target allocation efficiency measure corresponding to an amount of the link load that is to be allocated amongst the traffic flows, and define one or more constraints on the system of equations based on the target allocation efficiency.

46. The computer program of claim 43, wherein the gravity measures are relative measures corresponding to each node's capacity to source traffic and to sink traffic.

47. The computer program of claim 43, wherein optimizing the objective function corresponds to a minimization of a difference between the one or more gravity measures and corresponding measures based on the determined traffic flow.

48. The computer program of claim 47, wherein the computer program causes the processor to: determine a gravity score based on the difference, and report the gravity score to a user.

49. The computer program of claim 43, wherein optimizing the objective function corresponds to a minimization of a difference between the link loads and allocated amounts of load to traffic flow.

50. The computer program of claim 43, wherein the computer program causes the processor to: obtain user-defined source and sink weights and determine at least some of the plurality of gravity measures based on the user-defined source and sink weights.

51. The computer program of claim 50, wherein the computer program causes the processor to automatically generate a remainder of unassigned gravity measures after the plurality of gravity measures based on the user-defined source and sink weights, if any, are determined.

52. The computer program of claim 43, wherein the computer program causes the processor to: display the links as lines, and provide at least one of a color and a width of each line based on the determined traffic flows.

53. The computer program of claim 43, wherein the computer program causes the processor to present a select icon corresponding to each node based on the one or more gravity measures.

54. The computer program of claim 43, wherein the objective function based on the gravity measures includes:

$$\text{Minimize} \left| Ko_i \sum_{j \in S; j \neq i} \sum_{o \in O_j} f_o - (1 - Ko_i) \sum_{o \in O_i} f_o \right|,$$

where $Ko_i$ corresponds to a source gravity measure associated with $node_i$, and $f_o$ corresponds to each flow of a plurality of flows $O_i$ originating from $node_i$.

55. The computer program of claim 54, wherein the objective function based on the gravity measures includes:

$$\text{Minimize} \left| Ke_i \sum_{j \in S; j \neq i} \sum_{e \in E_j} f_e - (1 - Ke_i) \sum_{e \in E_i} f_e \right|,$$

where $Ke_i$ corresponds to a sink gravity measure associated with $node_i$, and $f_e$ corresponds to each flow of a plurality of flows $E_i$ ending at $node_i$.

56. A system comprising:
a loads to flow converter that converts link loads to traffic flows between pairs of nodes of a network, and
a user interface that presents the determined traffic flows via a display device,
wherein the loads to flow converter is configured to convert the link loads to traffic flows using a process that includes:
defining an objective function of a system of equations based on gravity measures associated with the nodes of the network,
defining constraints of the system based on the link loads, and
solving the system of equations so as to optimize the objective function subject to the constraints.

57. The system of claim 56, wherein the user interface that is configured to obtain user-defined source and sink weights, and the loads to flow converter is configured to determine the traffic flows based on the user-defined source and sink weights.

58. The system of claim 56, wherein the user interface is configured to: display the links as lines, and provide a color of each line based on the determined traffic flows.

59. The system of claim 58, wherein the color is also based on the link loads.

60. The system of claim 56, wherein the user interface is configured to: display the links as lines, and provide a width of each line based on the determined traffic flows.

61. The system of claim 60, wherein the width is also based on the link loads.

62. The system of claim 56, wherein the user interface is configured to present a select icon corresponding to each node based the node's ability to sink or source traffic flow.

* * * * *